Figure 1:
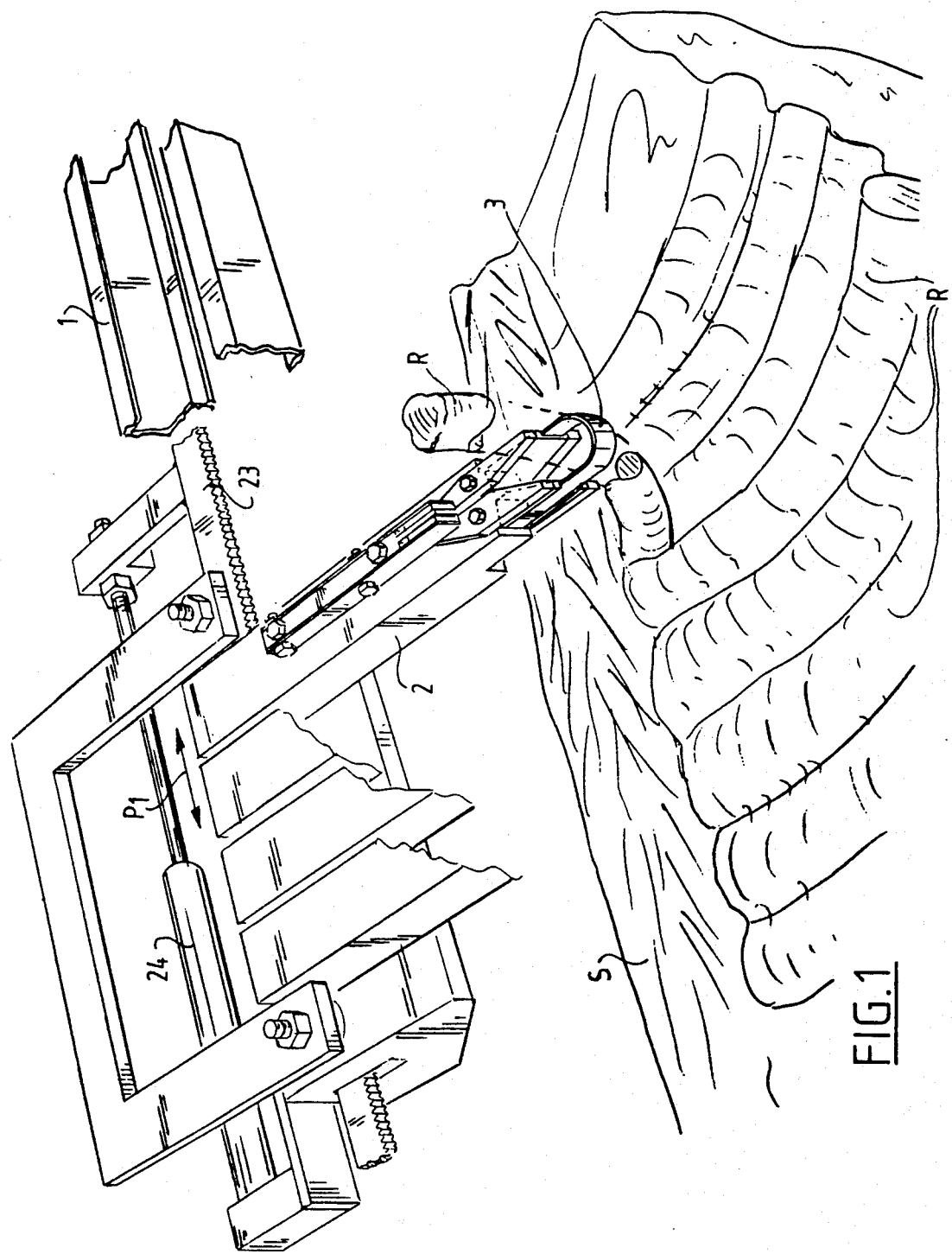

United States Patent [19]

Klaassen

[11] Patent Number: 5,197,918
[45] Date of Patent: Mar. 30, 1993

[54] DEVICE FOR SEPARATING BONY MATERIAL FROM A MEAT PIECE

[75] Inventor: Lambertus G. M. Klaassen, Rosmalen, Netherlands

[73] Assignee: Stork Protecom B.V., Oss, Netherlands

[21] Appl. No.: 738,253

[22] Filed: Jul. 31, 1991

[30] Foreign Application Priority Data

Aug. 1, 1990 [NL] Netherlands .................... 9001746

[51] Int. Cl.⁵ .............................................. A22C 17/00
[52] U.S. Cl. ...................................... 452/171; 452/135;
30/288; 30/380; 83/788
[58] Field of Search .................. 452/171, 135; 30/380, 30/288; 83/788

[56] References Cited

U.S. PATENT DOCUMENTS

| 3,197,808 | 8/1965 | Mears | 452/171 |
| 4,700,702 | 10/1987 | Nilsson | 30/380 |
| 4,850,111 | 7/1989 | McCullogh | 30/288 |

FOREIGN PATENT DOCUMENTS

| 0056656 | 1/1982 | European Pat. Off. . |
| 0319090 | 6/1989 | European Pat. Off. . |
| 1237923 | 3/1967 | Fed. Rep. of Germany . |
| 2709615 | 11/1977 | Fed. Rep. of Germany . |
| 1312962 | 2/1990 | Japan . |
| 8400471 | 2/1984 | PCT Int'l Appl. . |
| 592417 | 7/1977 | Switzerland . |
| 2150416 | 7/1985 | United Kingdom . |
| 2160409 | 12/1985 | United Kingdom . |

Primary Examiner—Willis Little
Attorney, Agent, or Firm—Webb, Burden, Ziesenheim & Webb

[57] ABSTRACT

A device for separating bony material, such as a rib, from a meat piece, for example a half belly piece, comprising a frame (1), wherein the meat piece is fixed, at least one carrier (2) supported by the frame, an elongate element (3) formed into a loop, a portion of which is arranged movably in the carrier, and drive means (23) connected to the carrier (2) for setting the element (3) into movement relative to the carrier, such that said loop-shaped elongate element can be arranged around a rib by placing it from one end thereof into the meat piece and moving it along the rib, whereas simultaneously a tensile force perpendicularly onto the rib is exerted, whereupon the rib piece can be separated from the meat and membranes and owing to the loop-shaped element as much meat as possible will remain behind in the meat piece.

17 Claims, 4 Drawing Sheets

DEVICE FOR SEPARATING BONY MATERIAL FROM A MEAT PIECE

The invention relates to a device for separating bony material, such as a rib, from a meat piece, for example a half belly piece.

Removing ribs from a belly piece demands heavy manual labour which takes a great deal of time, and the invention has for its object to provide a device with which these operations can be easily performed mechanically.

The device according to the invention is distinguished by a frame, wherein the meat piece is fixed, at least one carrier supported by the frame, an elongate element formed into a loop, a portion of which is arranged movably in the carrier, and drive means connected to the carrier for setting the element into movement relative to the carrier With the device according to the invention the loop-shaped elongate element can be arranged in each case around a rib by placing it from one end thereof into the meat piece and moving it along the rib. By simultaneously exerting tensile force perpendicularly onto the rib, the rib piece is separated from the meat and membranes in simple manner, wherein owing to the loop-shaped element as much meat as possible remains behind in the meat piece In a further development according to the invention the carrier is provided with means for adjusting the loop shape of the elongate element, for example the length and/or the arc curvature. Thus achieved is that the loop adapts better to the local cross section of the rib piece, whereby the contour line of this cross section of the rib piece can be more accurately followed.

In an embodiment the adjusting means are formed by at least one member movable relative to the carrier and engaging onto the side of the elongate element, whereby a sideways pressure can be exerted on the loop wherewith the shape of the loop can be changed in simple manner.

According to the invention it is also recommended to pre-load the member by spring means when it is embodied as a pivot arm. If two pivot arms are arranged movable towards and away from each other, the bias on the pivot arms is oriented either towards one another or away from one another.

According to the invention it is moreover recommended to drive the elongate element reciprocally by means of a flexible member such as a chain, belt or the like wound round a wheel.

When two or more carriers are used in the device use can be made of a single common drive, which drives each wheel simultaneously in the same direction. This drive direction can be unidirectional or oscillating, whereby the elongate element, if it is a closed circle, can be moved along the carrier in one continuous movement and, if it is a strip of determined length dimension, in a reciprocating movement.

Figure 2:
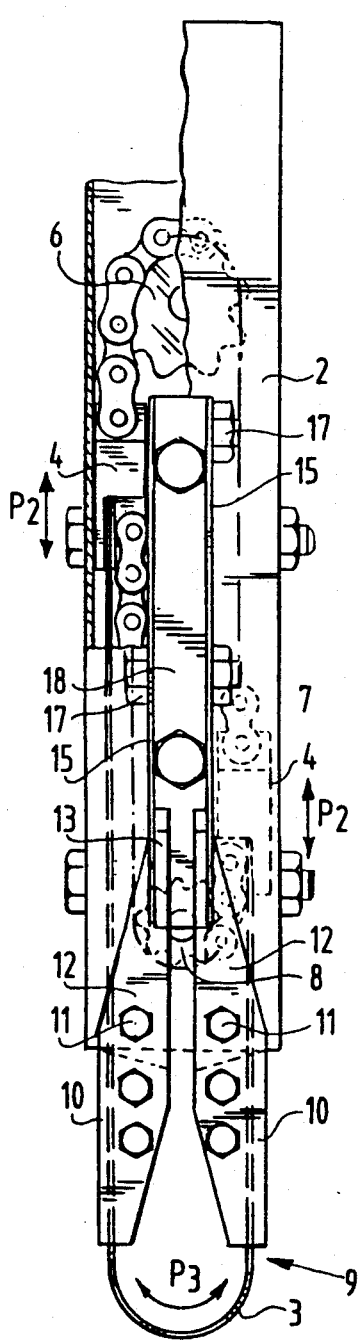
Figure 3:
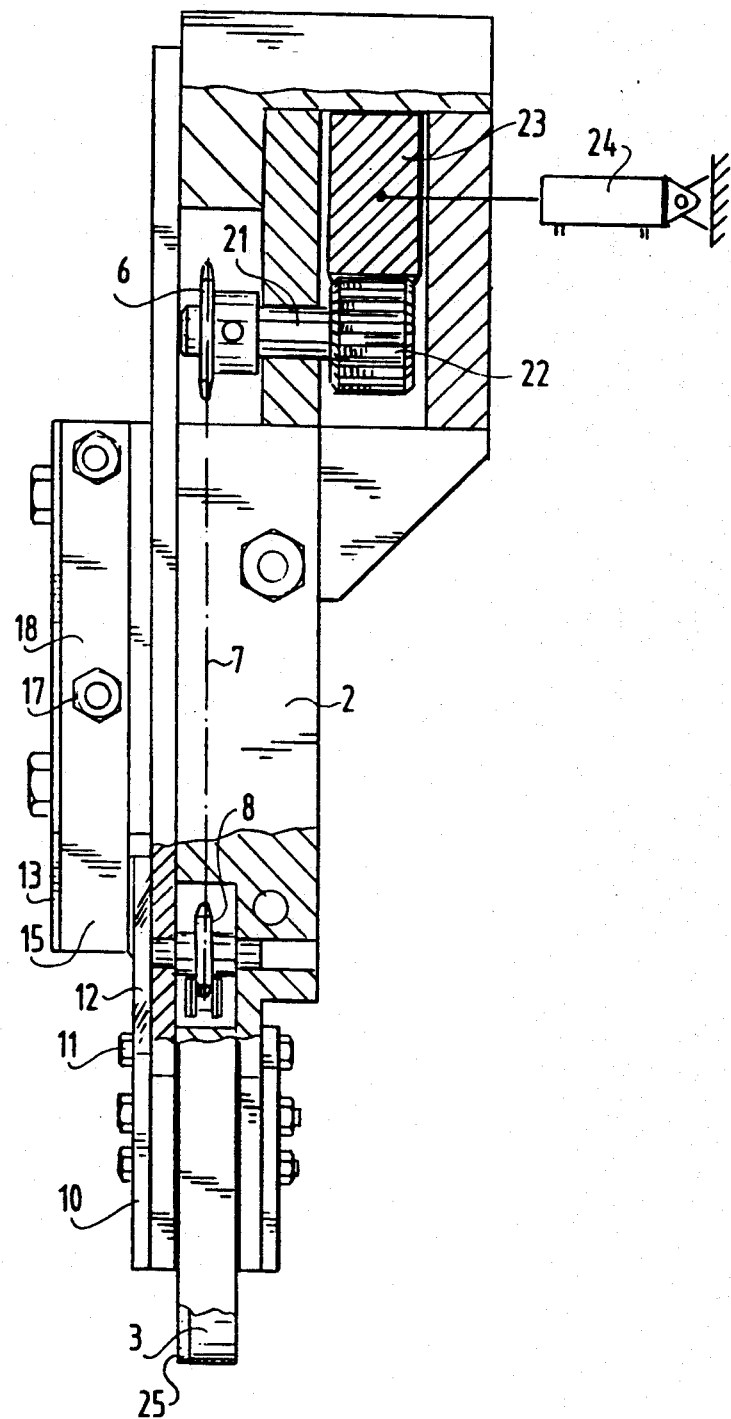
Figure 4:
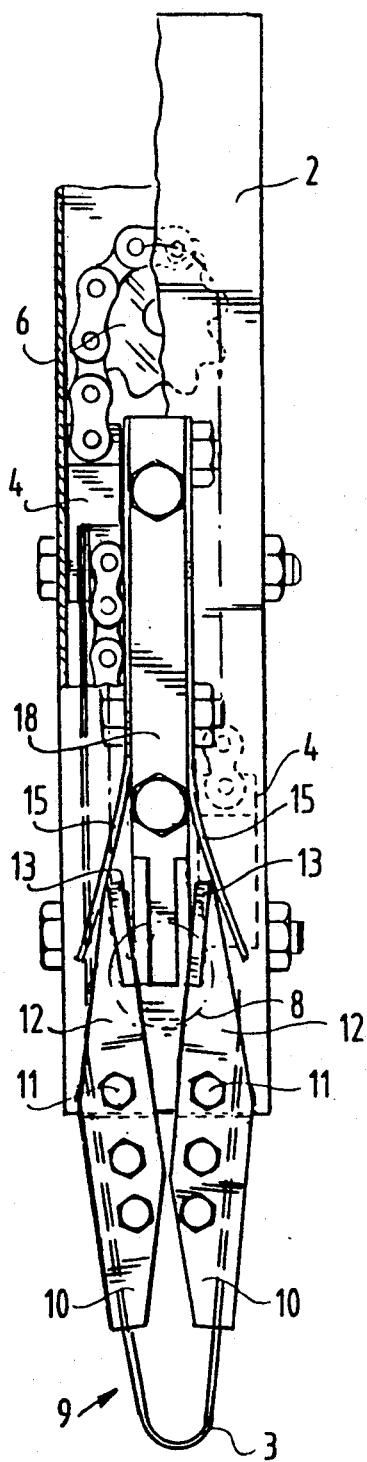
Figure 5:
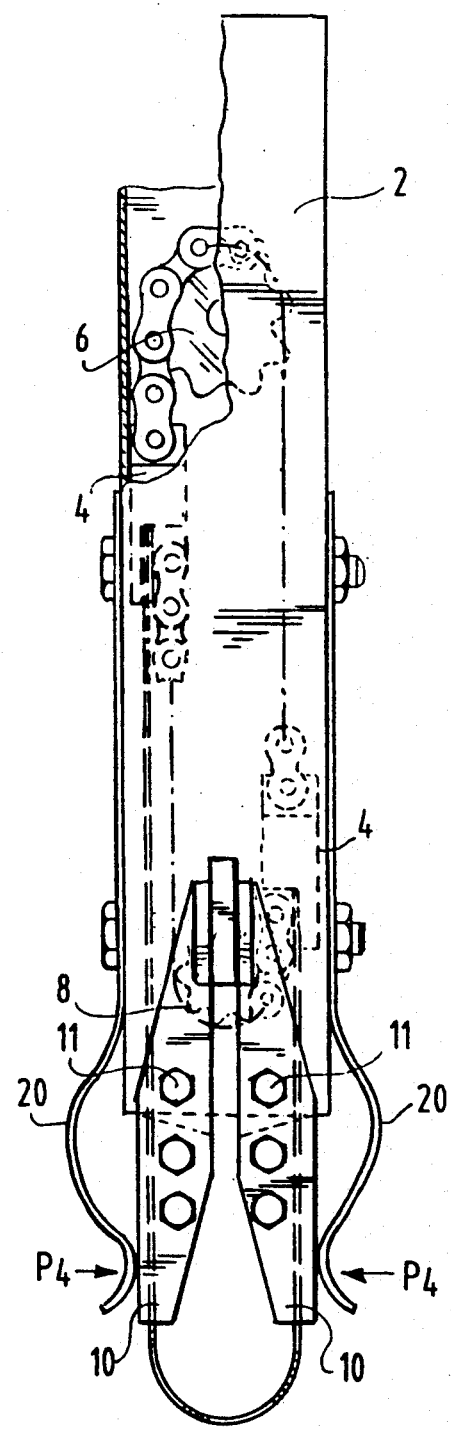
Figure 6:
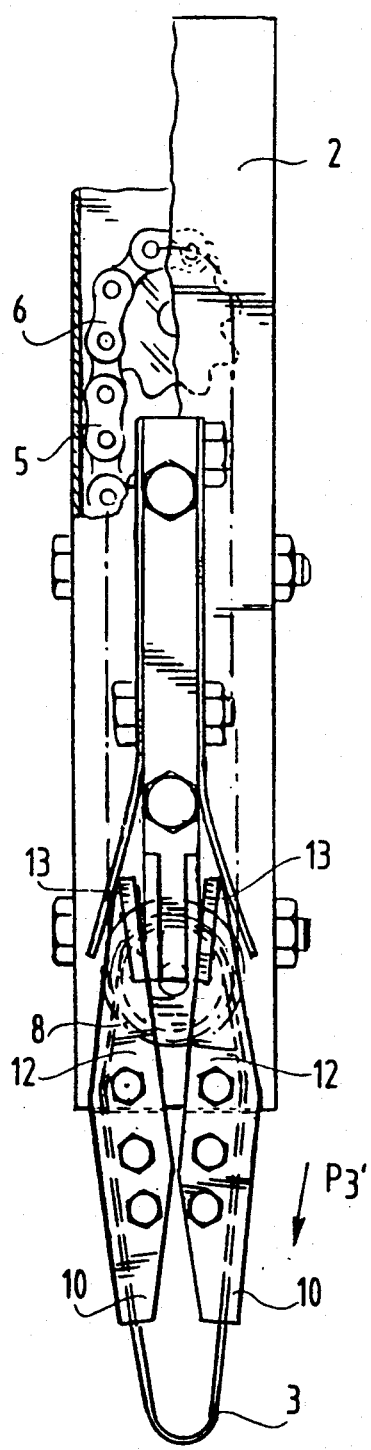
Figure 7:
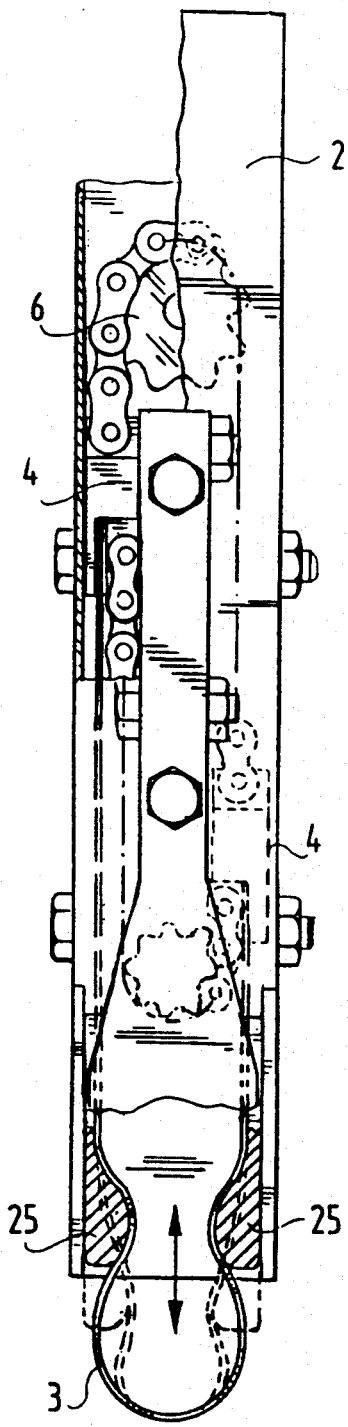

Above mentioned and other characteristics will be further elucidated in the figure description below of a number of embodiments. In the drawing FIG. 1 shows a perspective view of the device for removing ribs from a half belly piece, FIG. 2 shows a front view of a carrier with loop-shaped elongate element according to a first embodiment, FIG. 3 shows a side view of the carrier of FIG. 2, FIG. 4 is a side view corresponding with FIG. 2 of the carrier, with a different position of the adjusting means for the loop shape, FIG. 5 shows a view corresponding with FIG. 2 of a second embodiment of the carrier, FIG. 6 shows a view corresponding with FIG. 2 wherein the elongate element takes an endless form, FIG. 7 shows a view corresponding with FIG. 2 with a variant of the adjusting means.

Designated in the figures with the numeral 1 is the frame whereon a carrier 2 is supported for reciprocal movement in the direction of the arrow P1. Arranged under the frame 1 is a meat piece in the form of a half breast piece of a pig, whereof the backbone S extends parallel to the frame 1 and the ribs R lie on the top side of the meat piece.

The carrier 2 supports a loop-shaped elongate element 3 which is further elucidated below. The elongate element is brought into the shape of a loop which is placed around the rib at the one end of the rib and is then moved along the rib while simultaneously exerting a tensile force on the rib so that this is lifted upward out of the meat piece. Because of the loop-shaped elongate element little meat remains behind on the rib piece.

A description of the carrier 2 with the loop-shaped element 3 now follows with reference to the FIGS. 2 to 6.

The carrier 2 is substantially formed by a tubular housing of any random material, for example stainless steel, plastic and the like.

In the embodiment according to FIG. 2-5 both ends of an elongate element 3 are placed in the interior of the housing 2, which both ends are fixed to sliding pieces 4 each of which is reciprocally movable in the direction of the arrow P2 independently of one another in its own guide path in the housing 2.

The sliding piece 4 is fixed on one side to a flexible element 5 in the form of a link chain which is trained round a wheel 6. When the wheel 6 rotates in the one direction, the sliding piece on the left in FIG. 2 will thus be moved downward and the sliding piece on the right in FIG. 2 upward. When the movement is reversed an opposite movement takes place. Because the ends of the loop-shaped elongate element 3 are fixed to the sliding pieces 4 the elongate element 3 will be moved reciprocally in the direction of the arrow P3 while retaining a determined loop shape as at the bottom of FIG. 2.

In order to effect a positive movement of the elongate element 3 a second flexible element 7 is fixed to the sliding pieces 4, which second flexible element 7 is trained around a reverse gear 8. In this way a pulling movement on the left-hand sliding piece 4 will also cause a pulling movement on the left-hand part of chain 7, whereby the right-hand sliding piece 4 is pulled downward with a reversed movement of the drive wheel 6 the sliding pieces 4 will be moved back.

A particular feature of the invention can be seen in the means 9 for adjusting the loop shape of the elongate element 3. These means are preferably embodied as pivot arms 10 which are pivotal relative to the carrier 2 around a pivot pin 11 perpendicularly of the plane through the loop of the elongate element 3. The elongate element 3 is positively guided in a fitting opening of the pivot arm 10 so that when the arms 10 rotate or pivot around the pins 11 the ends of the pivot arms 10 are moved toward each other as according to FIG. 4. This causes a different shape of the loop of the elongate element 3.

In the embodiment according to FIGS. 2, 3 and 4 the pivot arms 10 are biased by means of a spring plate 15 associated with each arm 10, that is, these hold the pivot arm 10 in a preferred position. When the arm 10 is pivoted around the pin 11 the spring plate 15 will be moved outward, see FIG. 4 and cause a resetting force on the arm 10 because the arm 10 is elongated with an arm 12 extending beyond the pivot point 11, which arm 12 has a standing side 13 against the outside of which the end of the spring plate 15 rests. The spring plate 15 is fixed by means of bolts 17 to a standing ridge 18 of the carrier 2.

In the embodiment according to FIG. 5 the pivot arms 10 are biased toward each other by means of spring plates 20 arranged on the outside of the housing 2, which plates 20 exert on the end of the pivot arm 10 an inwardly directed pressure in the direction of the arrow P4. The position shown in FIG. 5 will be changed as a result of the pressure of the spring plates 20 to that according to FIG. 4. This spring plate action is therefore opposite to the spring plate action according to FIG. 2, and the embodiment is dependent on use.

FIG. 6 shows an embodiment wherein no use is made of a finite elongate element 3, but of an endless elongate element 3 such that by means of the reverse wheel 8 this can be driven in unidirectional rotation whereby the elongate element is only moved in the direction of the arrow P3'.

FIG. 7 shows an embodiment wherein the pivot arms are disposed fixedly and serve as guiding for a sliding piece 25 with which the loop protruding outside the carrier can be made smaller or its arc curvature changed The driving of the elongate element 3 in the oscillating or single movement can take place by driving the drive wheel 6, for example chain wheel, which is arranged by means of a pin on a rotation shaft 21. The rotation shaft is rotatably mounted in the housing 2 and has at the other end a toothed pinion 22 which co-acts with a gear rack 23. The gear rack 23 can be set into a reciprocating movement by means of a double acting cylinder 24 shown only schematically in the figure.

With the reciprocal driving of the cylinder 24 the reciprocal movement of the elongate element 3 is therefore brought about via the above described chain transmission.

This gear rack driving is particularly important if more than one carrier 2 is arranged on the frame 1. A single gear rack 23 can thereby simultaneously actuate all the carriers and simultaneously set all the elongate elements 3 of the carriers into a reciprocating movement.

In the case of the embodiment according to FIG. 6 it is possible to dispense with a gear rack 23 and to make use of a chain or gear drive which can be driven in a single rotational sense.

The elongate element 3 can be made of any random material, such as for example a flexible belt as shown in the figures or alternatively in the form of a thin cord.

Should use be made of a belt, then the edge is preferably sharpened by means of a slanting surface 22 on the inside of the loop, see FIG. 3.

The invention is not limited to the embodiment described above, so it is possible to guide only one element along more than one carrier such that a protruding loop results in the case of each carrier.

I claim:

1. A device for separating bony material, such as a rib, from a meat piece, for example a half belly piece, comprising a frame, wherein the meat piece is fixed;
   at least one carrier supported by the frame;
   an elongate element formed into one or more loops, a portion of which is arranged movably in the carrier;
   drive means connected to the carrier for setting the element into movement relative to the carrier;
   wherein the carrier is provided with means for adjusting the loop shape of the elongate element.

2. A device for separating bony material as claimed in claim 1, wherein the adjusting means are formed by at least one member movable relative to the carrier and engaging onto a side of the elongate element.

3. A device for separating bony material as claimed in claim 2, wherein the adjusting member comprises a pivot arm.

4. A device for separating bony material as claimed in claim 3, wherein the pivot arm is pre-loaded by means of spring means.

5. A device for separating bony material as claimed in 4 wherein two pivot arms are pre-loaded towards one another.

6. A device for separating bony material as claimed in claim 4, wherein the elongate element is driven by means of a flexible member wound around a wheel.

7. A device for separating bony material as claimed in claim 6, wherein the elongate element comprises a belt made of flexible material.

8. A device for separating bony material as claimed in claim 1, wherein the elongate element is driven by means of a flexible member wound around a wheel.

9. A device for separating bony material as claimed in claim 8, wherein the flexible member is a chain.

10. A device for separating bony material as claimed in claim 8, wherein the wheel is rotatably mounted in the carrier and is provided with a drive pinion.

11. A device for separating bony material as claimed in claim 10, further comprising more than one carrier having a drive pinion, wherein the drive pinions of the carriers are rotated by a common drive.

12. A device for separating bony material as claimed in claim 1, wherein the elongate element comprises a belt made of flexible material.

13. A device for separating bony material as claimed in claim 12, wherein the flexible belt has at least one sharpened edge.

14. A device for separating bony material, such as a rib, from a meat piece, for example a half belly piece, comprising a frame, wherein the meat piece is fixed;
   at least one carrier supported by the frame;
   an elongate element formed into one or more loops, a portion of which is arranged movably in the carrier;
   drive means connected to the carrier for setting the element into movement relative to the carrier;
   wherein the elongate element comprises a belt made of flexible material;
   wherein the flexible belt has at least one sharpened edge;
   wherein the edge of the flexible belt is sharpened by a slanting surface on the inside of the loop.

15. A device for separating bony material, such as a rib, from a meat piece, for example a half belly piece, said device comprising;
   a frame wherein the meat piece is fixed;

a plurality of carriers supported by said frame, each said carrier including a drive pinion and an elongate element formed into one or more loops, a portion of which is arranged movably in said carrier; and a common reciprocal drive means connected to each said carrier for driving each said drive pinion and setting each said element into reciprocal movement relative to said carrier.

16. A device for separating bony material as claimed in claim 15, wherein said elongate element is driven by a flexible member wound around a wheel.

17. A device for separating bony material as claimed in claim 16, wherein said flexible member is a chain.

* * * * *